United States Patent [19]

Sederquist

[11] 4,381,187

[45] Apr. 26, 1983

[54] PROCESS FOR GASIFYING LIQUID HYDROCARBON FUELS

[75] Inventor: Richard A. Sederquist, Newington, Conn.

[73] Assignee: United Technologies Corporation, Hartford, Conn.

[21] Appl. No.: 325,413

[22] Filed: Nov. 27, 1981

Related U.S. Application Data

[63] Continuation of Ser. No. 132,760, Mar. 24, 1980, abandoned.

[51] Int. Cl.³ .......................... C10G 11/28; C01B 2/16
[52] U.S. Cl. ......................................... 48/212; 252/373
[58] Field of Search ............... 48/212; 123/3; 252/373

[56] References Cited

U.S. PATENT DOCUMENTS

| | | | |
|---|---|---|---|
| 4,087,259 | 5/1978 | Fujitami et al. ...................... 252/373 |
| 4,115,074 | 9/1978 | Yoshida et al. ........................ 48/212 |
| 4,273,560 | 6/1981 | Kostka ................................... 48/212 |

Primary Examiner—Peter F. Kratz
Attorney, Agent, or Firm—Stephen E. Revis

[57] ABSTRACT

Gasifying liquid hydrocarbon fuels, and in particular liquid heavy hydrocarbon fuels, at high fuel-to-air equivalence ratios with no significant soot formation comprises the steps of mixing the fuel and heated air in a prevaporization and mixing zone to prevaporize only a portion of the liquid fuel using only the sensible heat in the air, passing the partially vaporized fuel-air mixture through a catalyst zone to catalytically combust at least some of the prevaporized portion of the fuel while simultaneously, without the use of an external heat source, vaporizing and gasifying as-yet unvaporized fuel using the additional heat generated by the catalytic combustion, wherein the length of the catalyst zone, the catalyst configuration, and the fuel flow rate have been preselected to obtain the desired amount of gasification and to sustain continuous gasification with no significant soot formation.

7 Claims, 3 Drawing Figures

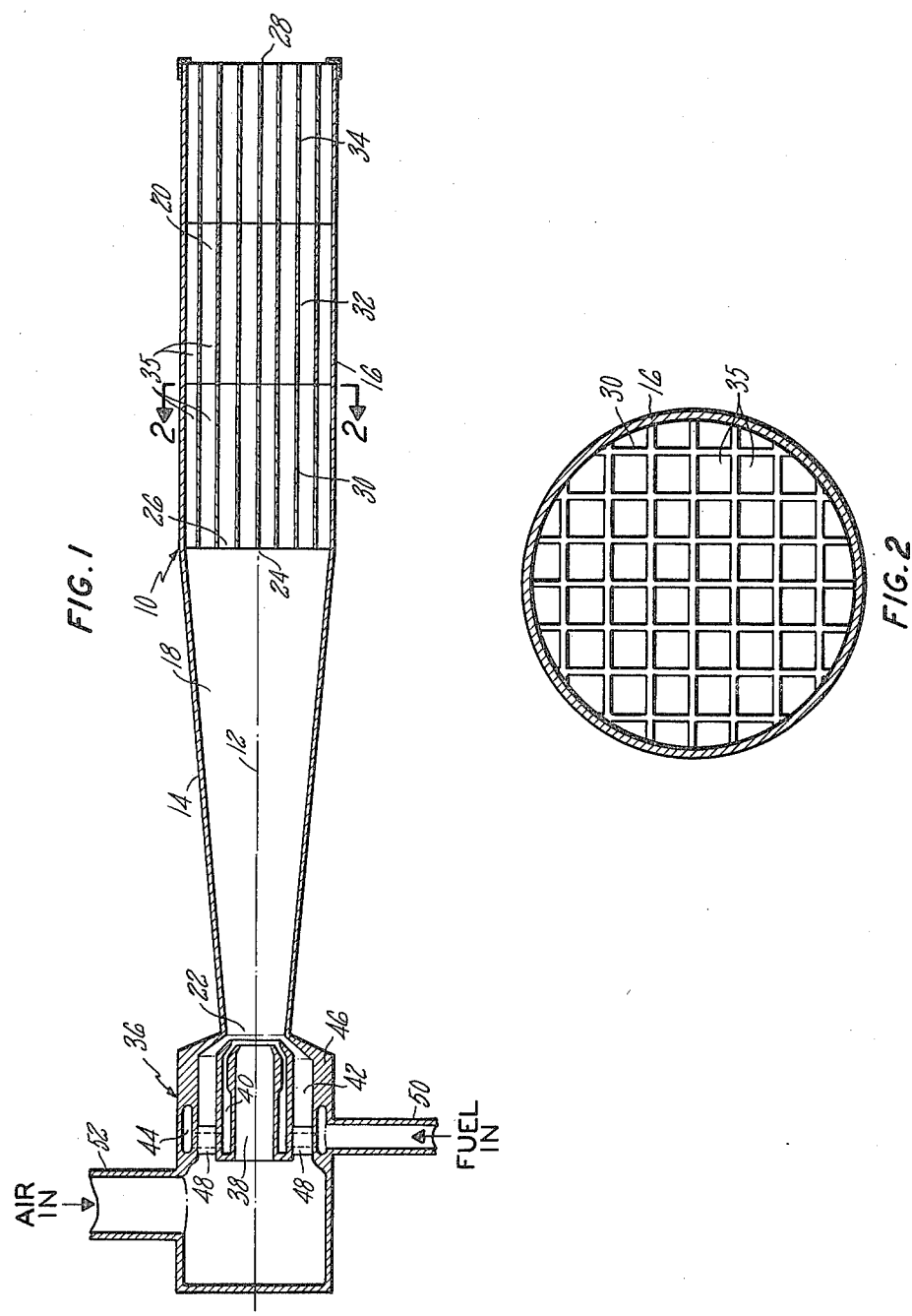

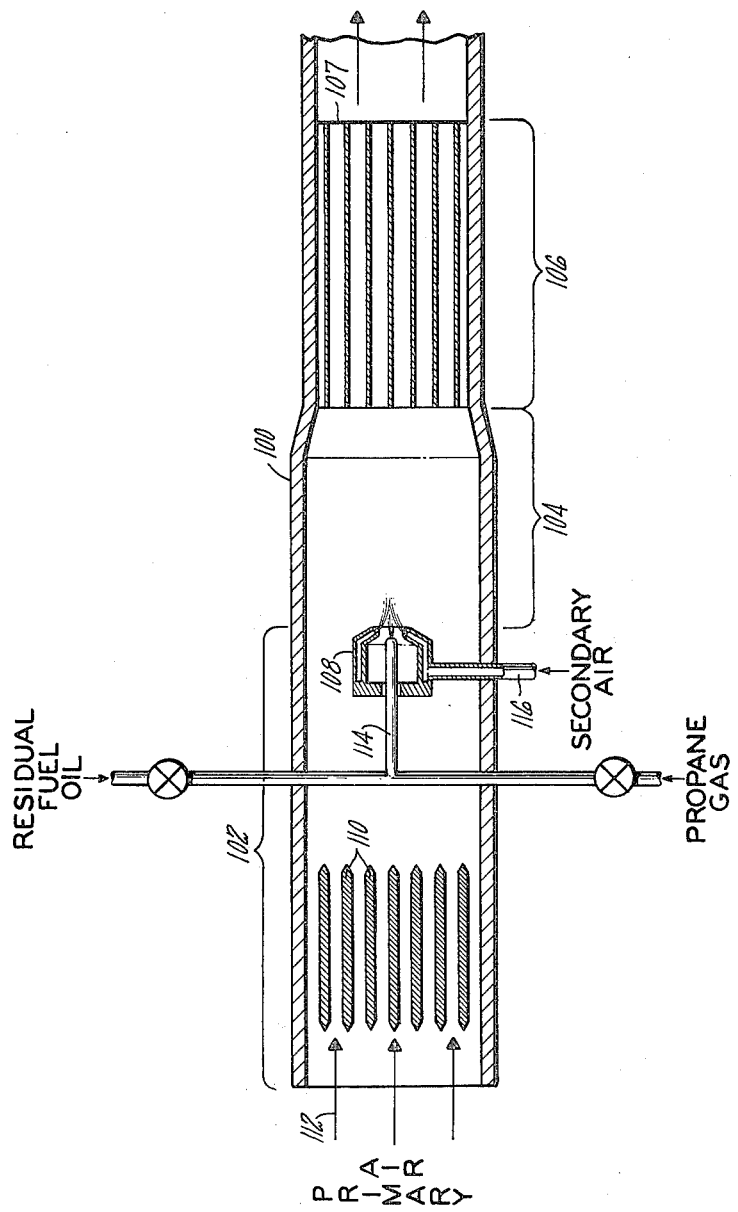

PROCESS FOR GASIFYING LIQUID HYDROCARBON FUELS

DESCRIPTION

This is a continuation of application Ser. No. 132,760 filed on Mar. 24, 1980, now abandoned.

1. Technical Field

This invention relates to gasification of liquid hydrocarbons, and more particularly to the gasification of heavy fuels.

2. Background Art

It is desirable to be able to gasify liquid hydrocarbon fuels, and particularly heavy hydrocarbon fuels, at high fuel-to-air equivalence ratios without the formation of soot. The object is to convert the fuel, efficiently and cleanly, to a gas consisting of hydrogen and light and intermediate hydrocarbons (plus carbon oxides and water) which may be used directly in burners, gas turbines, and furnaces and for other applications where a gaseous fuel is preferable to an atomized liquid fuel. The high fuel-to-air equivalence ratio (i.e., fuel rich operation) is desired to limit the gasification temperature and the extent of conversion in the gasification process.

In the gasification of hydrocarbon fuels soot is thermodynamically predicted for equilibrium mixtures with atomic oxygen-to-carbon ratios at or below 1.0. This corresponds to fully equilibrated mixtures with fuel-to-air equivalence ratios $\phi$ of greater than 3.0. The equivalence ratio $\phi$ is the actual fuel-to-air ratio divided by the stoichiometric fuel-to-air ratio. When $\phi$ exceeds 3.0 equilibration of the fuel-air mixture to hydrogen, carbon oxides, methane and water can result in the formation of carbon or soot if operating conditions result in too much reforming of the fuel. At product gas temperatures of about 1400° or greater, and particularly above 1600°, the following formula, which corresponds to the atomic oxygen-to-carbon ratio of the reform products, can be used to approximate the conditions required to avoid soot formation:

$$\frac{Y_{CO} + 2Y_{CO_2} + Y_{H_2O}}{Y_{CO} + Y_{CO_2} + Y_{CH_4}} > 1 \quad (1)$$

In the above formula each "Y" term is the product mole fraction of the subscripted species. In other words, Y is the volume percent of the indicated species in the product gas.

Once in vaporous form, fuel may be catalytically partially oxidized and reformed in an autothermal catalytic reactor. Light hydrocarbon fuels have been gasified in such a manner at fuel-to-air equivalence ratios above 3 and as high as 10 by passing a 100% prevaporized fuel-air mixture over a catalyst, taking care to select or control, for example, fuel flow rate, temperature, residence time and catalytic activity to prevent equilibration of the products and soot formation (See Equation (1)). Complete prevaporization of the fuel is achieved by mixing the fuel with very hot air and/or by supplying external heat to boil the fuel. Normally there is not enough sensible heat in the air at high equivalence ratios to completely vaporize the fuel, which necessitates the use of an external heat source.

Heavier hydrocarbon fuels cannot easily be completely prevaporized. Petroleum residual fuels contain components which cannot be vaporized by normal atomization or heating techniques. Thus, the prior art gasification processes using 100% prevaporized fuel hereinabove mentioned cannot be used for these difficult to vaporize fuels.

DISCLOSURE OF THE INVENTION

An object of the present invention is to gasify liquid hydrocarbon fuels.

Another object of the present invention is to gasify heavy hydrocarbon fuels efficiently and cleanly on a continuous basis.

A further object of the present invention is to completely gasify up to 100% of liquid heavy hydrocarbon fuels under fuel rich conditions on a continuous basis without the formation of detrimental amounts of soot.

Accordingly, the present process for gasifying a liquid hydrocarbon fuel comprises the steps of introducing the atomized fuel and heated air into a mixing and prevaporization zone at a fuel-to-air equivalence ratio of greater than 3.0, and vaporizing in the zone only a portion of the said liquid fuel using only the sensible heat in the air; then, in a catalyst zone, catalytically combusting the vaporized portion of the fuel and simultaneously, without the use of an external heat source, vaporizing and gasifying as-yet unvaporized fuel, wherein the fuel-to-air equivalence ratio, the catalyst, the length of the catalyst zone, the catalyst configuration, and the fuel flow rate have been preselected to obtain the desired amount of gasification, to sustain continuous gasification using only the heat generated by reactions within the catalyst zone, and to prevent the formation of detrimental amounts of soot during the process.

Prevaporizing only a portion of the liquid fuel is a significant departure from the prior art; a departure which the prior art would assume posed insurmountable problems. Surprisingly, this departure has not turned out to be insurmountable, but has instead been turned to an advantage. In developing the process of the present invention, the initial concern was that the large quantity of unvaporized fuel entering the catalyst zone would quench the catalytic combustion of the vaporous portion of the fuel. For example, the liquid fuel droplets act as a large heat sink; impingement of the fuel droplets on the catalyst surface can directly quench the surface reactions; and, the relatively low temperature of the gas phase mixture may be capable of keeping the reaction from continuing simply by convective heat transfer cooling as the mixture moves through the catalyst zone. Surprisingly, it has been found that the factors tending to reduce, inhibit, or prevent the catalytic combustion process can be overcome even at very high fuel-to-air equivalence ratios by appropriate selection of the catalyst, the catalyst's physical configuration, and the fuel flow rate. Once catalytic combustion is initiated, it is possible to maintain the catalytic combustion of the fuel-air mixture without an additional heating source at overall fuel-to-air equivalence ratios as high as 10 (and perhaps even higher) using fuels such as No. 2 distillate and No. 6 residual fuel oil while prevaporizing only a small percent of the fuel.

To start the process the catalyst is usually preheated by some suitable means. A portion of the fuel is then prevaporized, mixed with air, and fed into the catalyst zone along with the unvaporized portion of the fuel. The vaporous portion of the fuel contacts the preheated catalyst in the catalyst zone and is burned catalytically to oxides of carbon and water vapor, with heat being produced. This heat vaporizes additional fuel and increases the temperature of the catalyst and the fuel-air mixture further. The heat being generated must also be sufficient to overcome the cooling effects of the unvaporized liquid fuel which, unlike the prior art, is present in considerable quantities. Assuming this is accomplished, the temperature increases quickly to a steady state and is hot enough to thermally crack the bulk of the fuel passing through the catalyst zone. By the end of the catalyst zone most and perhaps all of the fuel has been gasified by a combination of thermal cracking, catalytic partial oxidation, and reforming.

With regard to whether or not soot will be formed during the vaporization and gasification of liquid hydrocarbons, the presence of unvaporized liquid hydrocarbons turns out to be an advantage rather than a problem. In other words, while the system may be operating at a high overall equivalence ratio $\phi_o$, the problem of soot formation along the length of the catalyst zone is dependent primarily upon the ratio of the already vaporized and gasified portion of the fuel to the overall amount of air in the system. If this latter ratio is called the "gas phase" equivalence ratio $\phi_g$, then $\phi_g$ at any point along the length of the catalyst zone can be defined simply as the overall equivalence ratio $\phi_o$ times the fraction of fuel vaporized and/or gasified up to that point.

When $\phi_g$ is less than 3.0 carbon or soot formation will not be predicted thermodynamically. Only when $\phi_g$ exceeds 3.0 and the products are allowed to equilibrate can Equation (1) come into play. This event ($\phi_g > 3$) occurs immediately in prior art processes which completely prevaporize the fuel; but in the present process it may not occur for some distance downstream in the catalyst zone.

Although this process is particularly suited for handling heavy hydrocarbon fuels (herein defined as those with end boiling points of about 650° F. and higher), it is apparent the process may be advantageously used with virtually any hydrocarbon fuel.

BRIEF DESCRIPTION OF THE DRAWING

FIG. 1 is a sectional view of apparatus which may be used in the process of the present invention.

FIG. 2 is a cross-sectional view taken along the line 2—2 of FIG. 1.

FIG. 3 is a simplified representation of a test rig used in conducting tests relating to the process of the present invention.

BEST MODE FOR CARRYING OUT THE INVENTION

In the present process the gasification apparatus comprises a conduit containing a prevaporization and mixing zone, followed immediately downstream by a catalyst zone wherein gasification of the fuel occurs without the formation of soot. The fuel is sprayed into the prevaporization and mixing zone, and heated air is introduced into this zone so as to prevaporize part of the fuel and mix both the vaporized and unvaporized fuel with the heated air. A pressure atomizing or air assist atomizing fuel nozzle of the type well known, in, for example, gas turbine engine art, may be used for this purpose. Fuel-to-air equivalence ratios $\phi_o$ as high as 10 (or perhaps even higher) may be used in the present process which is particularly advantageous for ratios $\phi_o$ greater than 3.0.

Generally, for start-up the catalyst will have to be preheated to about 1000° to 1200° F., the exact temperature being determined by the conditions needed for a particular catalyst to ignite and sustain catalytic combustion. The first step, after preheating the catalyst, requires prevaporizing at least that amount of fuel necessary to initiate catalytic combustion on the preheated catalyst and to maintain the gasification process in continuous, self-sustaining operation. It has been determined that even at high overall equivalence ratios prevaporization of only a few percent of the fuel is required to produce a catalytically combustible mixture. The higher the end boiling point of the hydrocarbon fuel (i.e., the heavier the fuel) the more difficult the fuel is to prevaporize, and the higher the air temperature which will be required. Practically speaking it is probably not even possible to vaporize more than 50% of some heavier hydrocarbon fuels by using only the sensible heat of a heated air stream; and, anyway, it is not necessary or desirable to do so. Heavy hydrocarbon fuels are particularly suited for use with the present process for the very reason that only a small portion need be prevaporized. For example, with some heavy fuels such as petroleum residual fuel only a few percent (less than 10%) can be prevaporized; and this has been shown, in our experiments, to be adequate to initiate catalytic combustion.

Upon start-up, when the prevaporized portion of the fuel and air enter the preheated catalyst zone, catalytic combustion of the fuel to water and carbon oxide products occurs, and heat is released. This heat vaporizes additional fuel within the catalyst zone which also is catalytically combusted and, if the temperature has increased sufficiently, some fuel is vaporized and thermally cracked to hydrogen, methane and intermediate hydrocarbons, such as ethylene and propylene.

As hereinabove discussed, during start-up and thereafter the considerable amount of unvaporized liquid fuel entering the catalyst zone in the form of fuel droplets tends to reduce, inhibit, or prevent the initiation of and/or the maintenance of the catalytic combustion process. This results from a combination of effects such as the fuel droplets acting as a radiant heat sink, impingement of the fuel droplets on the catalyst surface, and by convective heat transfer cooling as the fuel/air mixture moves through the catalyst zone. The latter two effects may be minimized by the selection of an appropriate configuration for the catalyst within the catalyst zone. Preferably the catalyst zone consists of a plurality of catalytic wall surfaces extending in a downstream direction defining parallel channels or cells. All channels in any one configuration need not, however, have the same cross-sectional area; nor must the channels have a constant cross-sectional area along their length.

A preferred catalyst configuration of the aforementioned type is a monolithic structure. One or more catalyst monoliths may be arranged in succession along a common axis parallel to the direction of flow. These catalyst monoliths have the appearance of a honeycomb with hexagonal, square, triangular, round, or other shape cells. The monolith structure is formed from a noncatalytic, high temperature, usually inert substrate material such as ceramic or a metal. The substrate wall surfaces are covered with the appropriate catalytic material. The fact that the cells or channels are parallel to the direction of flow reduces the physical interaction between the catalyst and fuel droplets. Larger cells reduce impingement of fuel droplets on the surface of the catalyst and reduce convective heat transfer cooling of catalyst walls enough to allow catalytic combustion at the walls to proceed at a high enough rate to sustain the vaporization and gasification process using the energy released by the combustion. Assuming "cell dimension" means the diameter of a circle inscribed within a cell cross section perpendicular to the cell length, the preferred cell dimension is from 0.05 to 0.5 inch, with the most preferred cell dimension, based upon testing, being from 0.1875 to 0.30 inch. Cell wall thickness is preferably the minimum consistent with adequate strength. Typically wall thicknesses will range from about 0.02 to 0.06 inch, with the larger thicknesses being associated with larger cell dimensions.

Commercially available catalysts may be used in the present process. The most common of these catalysts comprise a combination of platinum and palladium. Other suitable catalytic materials may be platinum alone, a non-noble metal or metal oxide. The main considerations in selecting a catalyst are its activity and its selectivity, the goal being to promote combustion activity and to minimize reform activity. For this reason nickel, which is a well known reform catalyst, is not a good catalyst choice since it promotes reforming; however, catalysts which include some nickel might be suitable under certain conditions, and for this reason it is not intended to exclude nickel from within the scope of the present invention.

Assuming the catalyst and catalyst configuration for the expected operating conditions have been properly selected, catalytic combustion will be initiated on the preheated catalyst and, due to the exothermic nature of the combustion reaction and endothermic nature of the vaporization and thermal cracking reactions, the process will be self-sustaining and stable. Steady state operation is quickly reached with gas temperatures at the exit of the catalyst zone ranging from about 1000° F. to 2400° F., preferably 1300° F.–1800° F. Gas mixture temperatures at the catalyst zone inlet may be as low as 400° F. under some conditions, but will more typically be 500°–700° F.

With these temperatures significant gasification occurs by thermal cracking, which is desirable. However, within the catalyst zone where the gas phase equivalence ratio $\phi_g$ is 3.0 or greater, soot formation may occur if excessive equilibration of the fuel-air mixture by reforming is permitted. As heretofore stated, in prior art processes operating at overall equivalence ratios $\phi_o$ of 3.0 or greater this problem exists from the inlet to the outlet of the catalyst zone because all the fuel is prevaporized and $\phi_g$ always equals $\phi_o$. In the present process, when only a portion of te fuel is prevaporized, $\phi_g$ remains below thevalue of 3.0 for a considerable distance through the catalyst zone. For example, if only 10% of thefuel is prevaporized and the overall equivalence ratio$\phi_o$ is 6.0, the gas phase equivalence ratio $\phi_g$ at the beginning of the catalyst zone would be only 0.6. $\phi_g$ will not reach a value of 3.0 until another 40% of the fuel has been vaporized and/or gasified. Furthermore, until 100% of the fuel has been vaporized and/or gasified, wherein $\phi_g = \phi_o$, the present process will continue to operate under more favorable conditions (in terms of preventing soot formation by equilibration) than prior art processes.

In the present process, as well as in the prior art, the more the gas phase equivalence ratio exceeds 3.0 or the higher the temperature the more difficult it becomes to prevent equilibration and the formation of soot. At high temperatures the fuel is cracked to hydrogen methane and imtermediate hydrocarbons. Long residence times produce more severe fuel cracking and favor the formation of additional methane. As time proceeds under these conditions reforming of more and more of the hydrocarbons to hydrogen and carbon monoxide occurs. Water and carbon dioxide produced originally by catalytic combustion are consumed by reforming. Eventually Equation (1) can be violated and soot begins to be produced. Thus, residence time of the fuel within the catalyst zone becomes an important factor. The catalyst activity is relevant in this regard in that longer residence times are permissible with catalysts of lesser activity. Residence time can be controlled by varying the length of the catalyst zone or changing fuel and air flow rates. A lower gas phase equivalence ratio $\phi_g$ also permits a longer residence time prior to the onset of soot formation. For this reason, in the present process it is preferred that $\phi_g$ is less than $\phi_o$ over at least a major portion of the length of the catalyst zone.

The delay in reaching a gas phase equivalence ratio $\phi_g$ of 3.0 and the additional delay before $\phi_g \phi_o$ allows more latitude in selecting operating parameters, catalysts, and catalyst configuration than prior art processes. Depending upon the use to be made of the process, this latitude can be used to accomplish specific results or to satisfy certain needs. For example, as compared to prior art processes, it may be possible to tailor the process by appropriate selection of catalyst, catalyst configuration, catalyst zone length, temperatures, etc. to enable it to handle a much wider range of fuel flow rates, a wider range of equivalence ratios, or a wider variety of fuels. Because of the many and complex factors which play a role in achieving the objectives of the present process, it is expected that some experimentation will have to be conducted to select an appropriate combination of catalyst, catalyst configuration, catalyst zone length and other operating conditions.

In some situations complete or 100% gasification of the fuel may not be required. This is usually determined by the use to be made of the gasification products. Certain uses may be able to tolerate a few percent up to perhaps 20% ungasified liquid fuel in the products. Therefore, the present process is not intended to be limited to those cases wherein 100% of the fuel is gasified, although in most instances complete gasification can be achieved.

FIG. 1 shows a catalytic gasifier design which may be used in the process of the present invention. The gasifier comprises a conduit 10 of circular cross section having an axis 12. The conduit 10 includes a conical upstream diffuser portion 14 and a cylindrical downstream portion 16. In this embodiment the upstream portion 14 defines a prevaporization and mixing zone 18, while the downstream cylindrical portion 16 defines a catalyst zone 20. The prevaporization and mixing zone 18 includes an inlet 22 and an outlet 24. The catalyst zone 20 also includes an inlet 26 and an outlet 28. The outlet 24 of the prevaporization and mixing zone is coextensive with the inlet 26 to the catalyst zone. Disposed within the catalyst zone 20 are three identical catalyst monoliths 30, 32, 34. Each monolith has a cylindrical external shape whose axis is coextensive with the axis 12 of the conduit 10. FIG. 2 is a section taken between the monoliths 30 and 32 in a direction perpendicular to the axis 12. The monolith 30 is shown as having channels or cells 35 of square cross section all running parallel to the axis 12. The monoliths 30, 32, and 34 in this case are oriented such that their channels are aligned with each other.

At the inlet 22 to the prevaporization and mixing zone 18 is an air boost or air atomizing nozzle 36. The nozzle 36 comprises an axial cylindrical air passageway 38 and concentric inner and outer annular passageways 40, 42, respectively. The outer annular passageway 42 is an air passageway and the inner annular passageway 40 is a fuel passageway. All the nozzle passageways 38, 40, and 42 have their outlet ends substantially in the plane of the inlet 22 to the prevaporization and mixing zone 18. The upstream end of the inner annular fuel passageway 40 communicates with an annular manifold cavity 44 in the outer wall 46 of the nozzle 36 via hollow fuel transfer vanes 48 which extend radially across the outer annular air passageway 42. A fuel feed conduit 50 communicates with the manifold cavity 44. An air feed conduit 52 communicates with the upstream end of the air passageways 38 and 42.

To start up the gasifier the catalyst monoliths could be preheated by flowing hot air through the nozzle 36 and thence through the conduit 10. When the catalyst reaches a desired temperature the fuel would be introduced into the nozzle 36 via the conduit 50, the air temperature would be adjusted to an appropriate value, and the air flow rate would be modified to the appropriate level such that the desired overall fuel-to-air equivalence ratio is obtained.

Assuming a residual fuel oil flow rate through the gasifier 10 of 0.07 lbs/sec. at 200° F. to 250° F., an air flow rate of 0.17 lbs/sec. at 800° F. and 196 psia (i.e., $\phi_o \approx 6.0$), estimated appropriate dimensions for this gasifier include: a 6 inch long prevaporization and mixing zone 18 having a 0.75 inch diameter inlet 22 and a 1.8 inch diameter outlet 24; a catalyst zone 20 about 6 inches long with a diameter of 1.8 inches; and catalyst monoliths 30, 32, 34 of about 2.0 inches long each, with 0.25 inch between cell centers and 0.04 inch thick walls (16 cells per square inch). The monolith substrate material might be cordierite with a high surface area alumina wash coat catalyzed with a platinum/palladium formulation. (Note that the foregoing dimensions are estimates and modification may be required to achieve the objectives of the present invention. In this regard some experimentation may have to be conducted.)

As the fuel and air exits the nozzle 36 and enters the conduit 14, the liquid fuel is atomized and a portion of it is vaporized as it travels downstream within the prevaporization and mixing zone 18. Within this zone the fuel and air are mixed prior to their entry into the catalyst zone 20. When the vaporized fuel and air mixture contacts the preheated catalyst at the inlet 26, the vaporized fuel ignites and heat is generated. This heat vaporizes additional fuel further downstream within the catalyst zone 20, some of which is also catalytically combusted generating additional heat. As the temperature increases more fuel is vaporized and some of it is thermally cracked. A steady state is eventually reached wherein, assuming the operating conditions and the gasifier design have been correctly selected, the bulk of the fuel is being vaporized and thermally cracked throughout the length of the catalyst zone and no significant soot is being formed.

A catalytic gasifier test rig, as schematically shown in FIG. 3, was used to demonstrate the principles involved in the process of the present invention. The test rig included an essentially cylindrical conduit 100 having an upstream inlet portion 102, a prevaporization and mixing zone 104 and a catalyst zone 106. Upstream of the catalyst zone the inner diameter of the conduit 100 was 2.4 inches. The prevaporization and mixing zone 104 was 6 inches long. The catalyst zone 106 had an inner diameter of 2.0 inches and a length which varied from 3.0–6.0 inches depending upon the length of the cylindrical catalyst monolith or monoliths 107 disposed therein. Disposed on the axis of the conduit 100 immediately upstream of the prevaporization and mixing zone 104 was an air assist fuel injector type nozzle 108. Upstream of the nozzle 108 within the inlet portion 102 of the conduit 100 were disposed air straightening vanes 110 oriented parallel to the axis of the conduit. Downstream of the catalyst zone 106, but not shown in the drawing, was a water injection apparatus for cooling products exiting from the catalyst zone, for collecting any liquid fuel remaining, and for burning off the gases produced.

In operation primary air represented by the arrows 112 was introduced into the inlet portion 102 whereupon the air flow was turned parallel to the axis of the conduit 100 by the straightening vanes 110. Fuel (either propane gas for preheating at start-up or residual fuel oil for basic operation) was introduced into the nozzle 108 via the conduit 114, and secondary or atomizing air was introduced into the nozzle 108 via the conduit 116. Initiation of each of the tests hereinafter described began with an electrically heated primary air flow rate being established at a prescribed temperature. After a steady state rig temperature was reached, propane gas and secondary air were introduced through the nozzle 108. The primary air temperature was selected so that the steady state rig temperature was always sufficient to result in the propane and air igniting upon contact with the catalyst, thereby increasing the temperature of the catalyst. Propane flow was continued until the catalyst was heated to an initial temperature capable of sustaining the chemical reactions when the liquid residual fuel oil was used instead of the propane gas.

Upon reaching the desired preheat temperature, the propane flow was terminated and liquid fuel oil flow through the nozzle 108 was initiated. The amount of secondary air flow was selected so as to provide a fine fuel mist within the prevaporization and mixing zone. The atomized fuel became thoroughly mixed with the primary air and was partially vaporized within the prevaporization and mixing zone 104. The mixture thereupon passed through the catayst zone and the fuel was gasified. Catalyst performance parameters including temperaure and pressure drop measurements were monitored during each test. All tests were run at ambient pressure and utilized the same fuel, except as noted, which was a residual heating oil with a viscosity which was near the lower level of the residual fuel band. The properties of the fuel are shown in Table 1.

TABLE 1

| Fuel Properties | |
|---|---|
| Specific Gravity | 0.90 |
| Hydrogen-Carbon Ratio | 1.77 |
| Percent Nitrogen | 0.11 |
| Percent Sulfur | 0.38 |
| Viscosity, CS | 122 @ 77° F. |
| | 16.6 @ 194° F. |

Tests were run with four different catalysts and catalyst monolith configurations. In a first set of tests the catalyst (herein the "first catalyst") was a single monolith three (3.0) inches long with cells of 0.10 inch square cross section with approximately 0.02 inch thick walls.

The catalyst substrate was a zirconia spinel honeycomb with porous alumina having been applied on the surfaces thereof, and the alumina having been catalyzed with a 2:1 palladium to platinum coating at a loading of 1.4 g/m². The results of three runs made with this first catalyst are presented in Table 2.

TABLE 2

Results with First Catalyst (measured at end of each run)

| Run No. | 1 | 2 | 3 |
|---|---|---|---|
| Run Time (Min.) | 1.4 | 1.2 | 5.3 |
| Reference Air Velocity (FPS) | 32 | 35 | 34 |
| Equivalence Ratio $\phi_o$ | 6.6 | 8.2 | 6.8 |
| Primary Air Inlet Temp. (°F.) | 1170 | 1180 | 1040 |
| Temp. Entering Catalyst Zone (°F.) | 610 | 570 | 550 |
| Catalyst Wall Temp. (°F.) | 1110 | 1020 | 780 |
| Product Discharge Temp. (°F.) | 1500 | 800 | 620 |

By way of definitions in Table 2 and the tables which follow, Reference Air Velocity is the primary air velocity calculated at the Primary Air Inlet Temperature with no fuel flowing; and Catalyst Wall Temperature is the catalyst temperature measured at or near the mid-length point of the catalyst zone.

As regards testing with the first catalyst, it is estimated that less than 10% of the fuel was prevaporized. Of the three runs good results were obtained in the first, but performance deteriorated in subsequent runs as evidenced by a drop in catalyst wall temperatures and product gas discharge temperatures. Further evidence of deterioration is the fact that no ungasified fuel was collected downstream of the catalyst zone after the first run, but a few percent were collected after run No. 2 and even more after the third run. It is believed that the cell size was too small for the operating conditions such that excessive impingement of fuel on the catalyst surface occurred and caused deactivation, probably from contaminants in the fuel. On the other hand, operation was substantially soot free in all runs since no increase in pressure drop across the catalyst zone occurred.

In a second set of tests the catalyst consisted of two identical butted catalyst monoliths (with cells aligned) each 1.5 inches long with hexagonal cross section cells of 0.17 inch cell dimension with 0.02 inch thick walls. The substrate was an alumina honeycomb with porous alumina having been applied on the surface thereof, and the alumina having been catalyzed with a 1:1 palladium to platinum coating applied at a loading of 4.9 g/m². The results of the two runs made with this second catalyst are presented in Table 3.

TABLE 3

Results with Second Catalyst

| Run No. | Beginning 1 | End 1 | Beginning 2 | End 2 |
|---|---|---|---|---|
| Run Time (Min.) | — | 9.0 | — | 5.0 |
| Reference Air Velocity (FPS) | 33 | 33 | 32 | 32 |
| Equivalence Ratio $\phi_o$ | 6.0 | 6.0 | 6.0 | 6.0 |
| Primary Air Inlet Temp. (°F.) | 1120 | 1120 | 1175 | 1175 |
| Temp. Entering Catalyst Zone (°F.) | 590 | 560 | 590 | 590 |
| Catalyst Wall Temp. (°F.) | 1140 | 990 | 1120 | 920 |
| Product Discharge Temp. (°F.) | 1560 | 1220 | 1355 | 1350 |

As with tests conducted with the first catalyst, it is estimated that less than 10% of the fuel was prevaporized in both runs. Again good results were obtained with run No. 1 and performance deterioration occurred, but deterioration was not as severe as with the first catalyst. As far as could be determined 100% fuel gasification and no significant soot formation occurred in both of these runs. The better results are believed attributable to the larger cell dimension which means less physical interaction between unvaporized fuel and the catalyst surfaces.

In a third set of tests the catalyst consisted of two butted catalyst monoliths (with cells aligned) each 3.0 inches long with 0.27 inch square cross section channels and 0.06 inch thick walls. The substrate was zirconia spinel honeycomb with porous alumina having been applied on the surfaces thereof and the alumina having been catalyzed with 2:1 palladium to platinum coating applied at a loading of 1.7 g/m². The initial results (i.e., at essentially time zero) of four runs made with this third catalyst are presented in Table 4. Table 5 presents some comparative performance data for the beginning and end of each of these four runs.

TABLE 4

Initial Results with Third Catalyst

| Run No. | 1 | 2 | 3 | 4 |
|---|---|---|---|---|
| Reference Air Velocity (FPS) | 33 | 32 | 31 | 35 |
| Equivalence Ratio $\phi_o$ | 6.2 | 6.2 | 6.2 | 6.2 |
| Primary Air Inlet Temp. (°F.) | 1080 | 1115 | 1045 | 1215 |
| Temp. Entering Catalyst Zone (°F.) | 605 | 660 | 590 | 785 |
| Catalyst Wall Temp. (°F.) | 1280 | 1325 | 1300 | 1365 |
| Product Discharge Temp. (°F.) | 1150 | 1670 | 1275 | 1415 |

TABLE 5

Performance Changes with Third Catalyst

| Run No. | | Time Min. | Product Discharge Temperature, F. | Pressure Drop, in. H₂O |
|---|---|---|---|---|
| 1 | Beginning | 0 | 1150 | 2.2 |
|   | End | 5.8 | 1300 | 15.0 |
| 2 | Beginning | 0 | 1670 | 2.4 |
|   | End | 3.0 | 1650 | 6.0 |
| 3 | Beginning | 0 | 1275 | 2.5 |
|   | End | 2.5 | 1040 | 4.5 |
| 4 | Beginning | 0 | 1350 | 2.6 |
|   | End | 3.5 | 1250 | 17.5 |

The increasing pressure drop from the beginning to the end of each run with the third catalyst indicates that excessive equilibration occurred resulting in soot formation or carbon buildup within the catalyst zone. This was probably due to excessive catalyst zone length (i.e., excessive fuel residence time); note that the catalyst zone was twice the length of the zones used with the first and second catalyst configurations. Note, also, that the obstruction (i.e., carbon buildup) seemed to be removed between runs because the pressure drop at the beginning of each run was about the same as at the beginning of the previous run. The carbon was probably burned off by hot air flow (without fuel) between runs.

In another test (using the same rig) with No. 2 diesel fuel with a 700° F. primary air inlet temperature and an overall equivalence ratio $\phi_o$ of 7.0, a 17.0 minute run was made with two catalyst monoliths consisting of a 1.5 inch long monolith with 0.27 inch cell dimension and identical to the monolith used in the testing of the third catalyst, followed by and butted against a 1.5 inch long monolith with 0.17 inch cell dimension and identical to the monolith used in the testing of the second catalyst. Stable operation was achieved with a catalyst discharge temperature of 1500° F. It is estimated that less than 20% of the fuel was being prevaporized during this test. The catalyst zone pressure drop remained constant throughout the test indicating no significant cost formation. Liquid product collection in a downstream reservoir indicated approximately 85% gasification of the fuel. It is possible that a greater percentage of the fuel could be gasified, without detrimental effects, if the catalyst zone were made longer.

In this specification and the following claims, the phrase "no significant soot" means no soot or so little soot such that the process equipment and downstream equipment do not become fouled or plugged with carbon produced by the present process.

Although the invention has been shown and described with respect to the preferred embodiment thereof, it should be understood by those skilled in the art that various changes and omissions in the form and detail thereof may be made therein without departing from the spirit and scope of the invention.

I claim:

1. A process for gasifying, at an overall fuel/air equivalence ratio $\phi_o$ of greater than 3.0 and without significant soot formation, a liquid heavy hydrocarbon fuel having an end boiling point of 650° F. or greater, comprising the steps of:

introducing the liquid fuel and heated air at $\phi_o$ greater than 3 into a prevaporization and mixing zone and vaporizing in said zone less than 50% of the liquid fuel using only sensible heat in said air forming a mixture of air, vaporized fuel, and unvaporized fuel;

passing the entire mixture from said prevaporization and mixing zone through a catalyst zone disposed immediately downstream of said prevaporization and mixing zone said catalyst zone including a catalyst monolith consisting essentially of a ceramic or metal substrate having catalytic wall surfaces, said catalytic wall surfaces extending in a downstream direction defining a plurality of parallel cells with a cell dimension of between 0.05 and 0.50 inch said catalyst having been initially preheated sufficiently to initiate catalytic combustion of the vaporized fuel and air upon start-up of the process;

the catalyst, the length of the catalyst zone, the catalyst cell dimension, and the fuel flow rate having been preselected such that continuous vaporization and gasification of unvaporized liquid fuel is sustained within the catalyst zone after start-up using only the heat generated by the reactions within the catalyst zone and no significant soot is formed.

2. The process according to claim 1 wherein no more than 10% of the fuel is prevaporized.

3. The process according to claim 1 wherein said cells have a cell dimension of between 0.1875 and 0.30 inch.

4. The process according to claim 1 wherein the gas phase equivalence ratio $\phi_g$ is less than $\phi_o$ over at least a major portion of the length of the catalyst zone.

5. The process according to claim 1, 2 or 3 wherein essentially 100% of the fuel is gasified within the catalyst zone.

6. The process according to claim 1 or 2 wherein the product gas temperature exiting the catalyst zone is 1000° F. to 2400° F.

7. The process according to claim 1 or 2 wherein the product gas temperature exiting the catalyst zone is 1300° F. to 1800° F.

* * * * *

UNITED STATES PATENT AND TRADEMARK OFFICE
CERTIFICATE OF CORRECTION

PATENT NO. : 4,381,187

DATED : April 26, 1983

INVENTOR(S) : Richard A. Sederquist

It is certified that error appears in the above-identified patent and that said Letters Patent is hereby corrected as shown below:

Column 5, line 54: "100" should be --$\phi_g$--

Column 11, line 4: "cost" should be --soot--

Signed and Sealed this

Twenty-second Day of November 1983

[SEAL]

Attest:

GERALD J. MOSSINGHOFF

Attesting Officer

Commissioner of Patents and Trademarks